(12) United States Patent
Tatsuno et al.

(10) Patent No.: US 12,705,283 B2
(45) Date of Patent: Aug. 11, 2026

(54) GENERATION METHOD, SEARCH METHOD, AND GENERATION DEVICE

(71) Applicant: Kioxia Corporation, Tokyo (JP)

(72) Inventors: Kento Tatsuno, Kawasaki (JP); Daisuke Miyashita, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 15 days.

(21) Appl. No.: 18/828,012

(22) Filed: Sep. 9, 2024

(65) Prior Publication Data

US 2025/0245269 A1 Jul. 31, 2025

(30) Foreign Application Priority Data

Jan. 29, 2024 (JP) ................................ 2024-010798

(51) Int. Cl.
*G06F 16/00* (2019.01)
*G06F 16/245* (2019.01)
*G06F 16/2455* (2019.01)
*G06F 16/901* (2019.01)

(52) U.S. Cl.
CPC .... *G06F 16/9024* (2019.01); *G06F 16/24552* (2019.01); *G06F 16/24569* (2019.01)

(58) Field of Classification Search
CPC ........... G06F 16/9024; G06F 16/24552; G06F 16/24569; G06F 16/2237; G06F 16/245
See application file for complete search history.

(56) References Cited

U.S. PATENT DOCUMENTS

2018/0068023 A1 3/2018 Douze et al.
2020/0226137 A1 7/2020 Zhao et al.
2021/0117459 A1 4/2021 Tan et al.
2025/0181888 A1* 6/2025 Zhu .......................... G06N 3/04

FOREIGN PATENT DOCUMENTS

CN 112685603 A 4/2021
JP 6300982 B2 3/2018
JP 2019532445 A 11/2019
JP 7006966 B2 1/2022

OTHER PUBLICATIONS

Subramanya et al., "DiskANN: Fast Accurate Billion-point Nearest Neighbor Search on a Single Note", Advances in Neural Information Processing Systems, 2019, pp. 1-11.

* cited by examiner

*Primary Examiner* — Paul Kim
(74) *Attorney, Agent, or Firm* — Maier & Maier, PLLC

(57) ABSTRACT

According to an embodiment, a generation method includes setting and writing. The setting is to set one of multiple first nodes as a second node. The multiple first nodes are included in a directed graph and are each assigned with an ID. The multiple first nodes respectively correspond to multiple first vectors included in a search range. The writing is to write an information piece that is an element related to the second node out of elements of index information corresponding to the directed graph. The information piece includes a second vector that is a first vector corresponding to a second node out of the multiple first vectors. The information piece includes an ID and a third vector for each of third nodes. The third nodes are all out-neighbor nodes of the second node. The third vector corresponds to one of the third nodes.

18 Claims, 8 Drawing Sheets

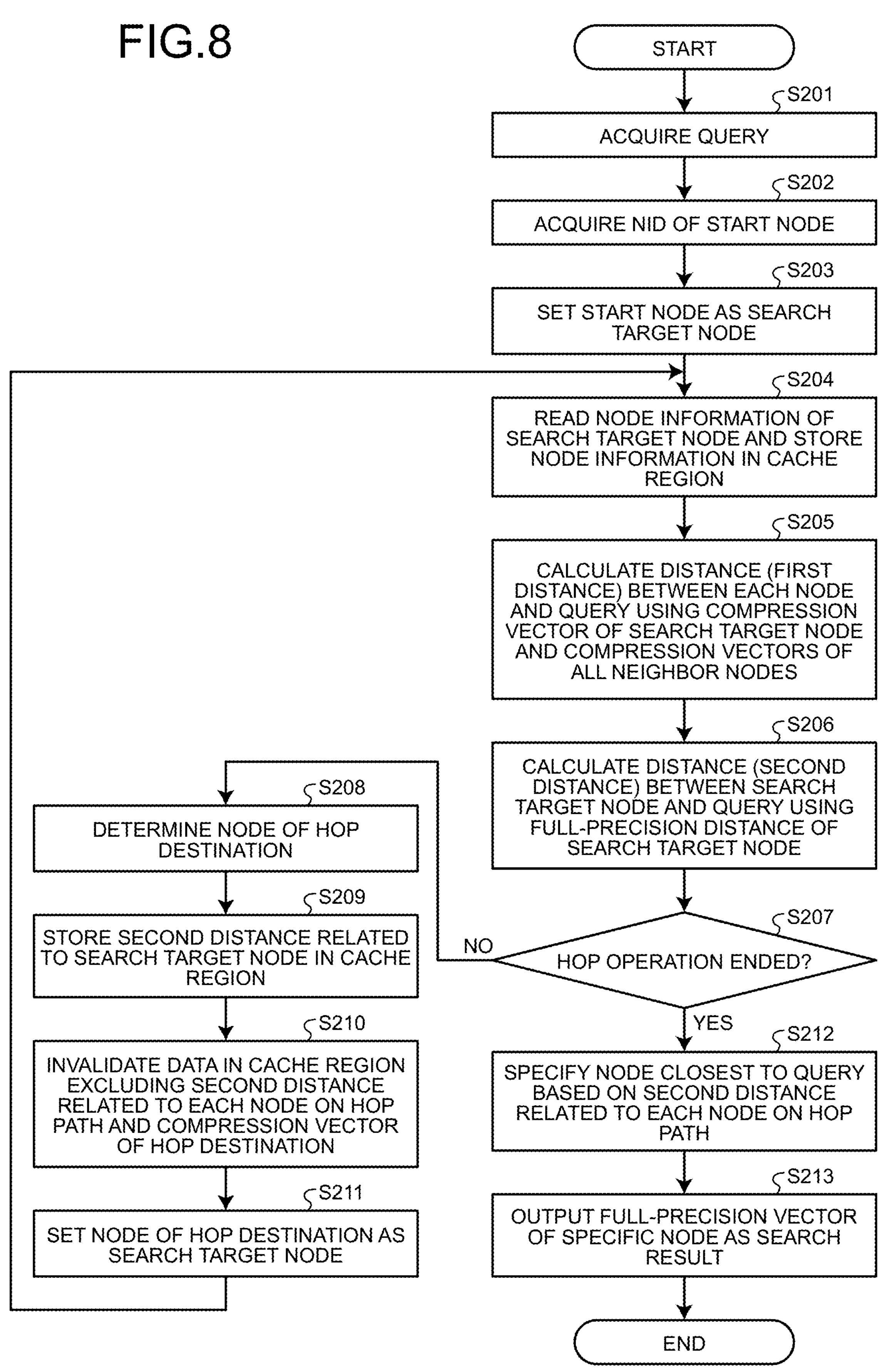
FIG.8
START
S201
ACQUIRE QUERY
S202
ACQUIRE NID OF START NODE
S203
SET START NODE AS SEARCH TARGET NODE
S204
READ NODE INFORMATION OF SEARCH TARGET NODE AND STORE NODE INFORMATION IN CACHE REGION
S205
CALCULATE DISTANCE (FIRST DISTANCE) BETWEEN EACH NODE AND QUERY USING COMPRESSION VECTOR OF SEARCH TARGET NODE AND COMPRESSION VECTORS OF ALL NEIGHBOR NODES
S206
CALCULATE DISTANCE (SECOND DISTANCE) BETWEEN SEARCH TARGET NODE AND QUERY USING FULL-PRECISION DISTANCE OF SEARCH TARGET NODE
S207
HOP OPERATION ENDED?
NO
YES
S208
DETERMINE NODE OF HOP DESTINATION
S209
STORE SECOND DISTANCE RELATED TO SEARCH TARGET NODE IN CACHE REGION
S210
INVALIDATE DATA IN CACHE REGION EXCLUDING SECOND DISTANCE RELATED TO EACH NODE ON HOP PATH AND COMPRESSION VECTOR OF HOP DESTINATION
S211
SET NODE OF HOP DESTINATION AS SEARCH TARGET NODE
S212
SPECIFY NODE CLOSEST TO QUERY BASED ON SECOND DISTANCE RELATED TO EACH NODE ON HOP PATH
S213
OUTPUT FULL-PRECISION VECTOR OF SPECIFIC NODE AS SEARCH RESULT
END

FIG.9

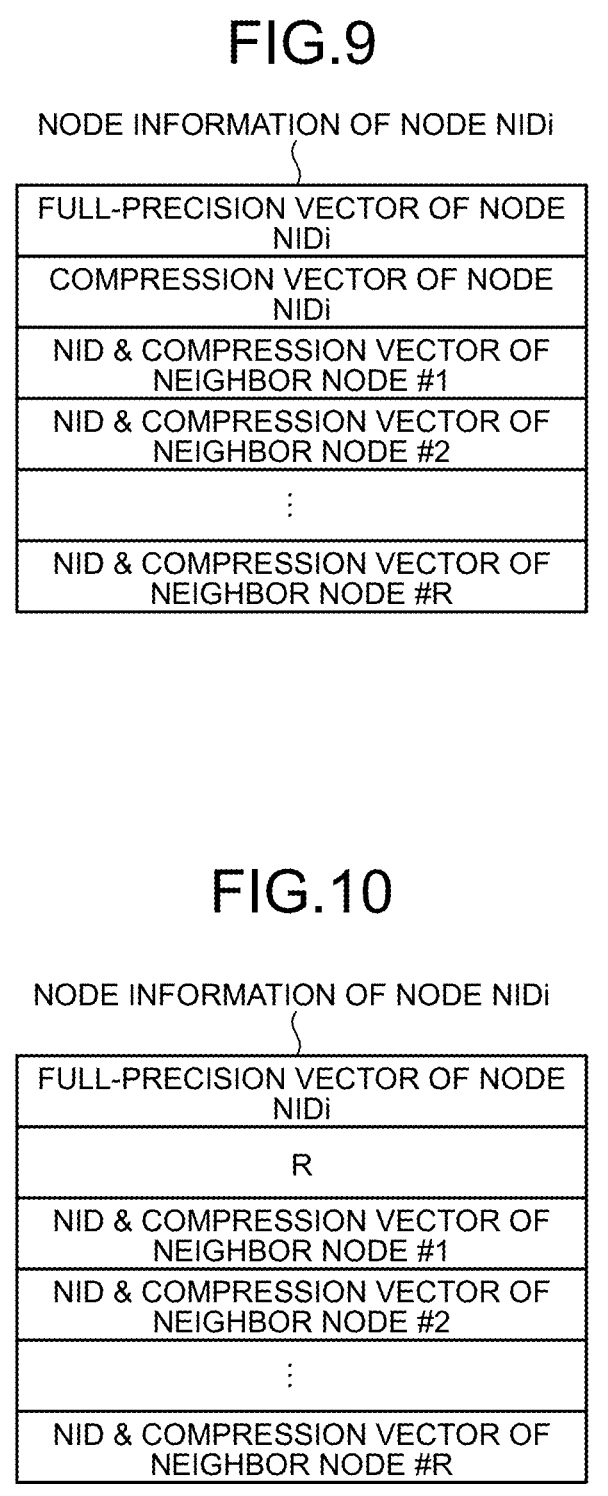

NODE INFORMATION OF NODE NIDi

| FULL-PRECISION VECTOR OF NODE NIDi |
|---|
| COMPRESSION VECTOR OF NODE NIDi |
| NID & COMPRESSION VECTOR OF NEIGHBOR NODE #1 |
| NID & COMPRESSION VECTOR OF NEIGHBOR NODE #2 |
| ⋮ |
| NID & COMPRESSION VECTOR OF NEIGHBOR NODE #R |

FIG.10

NODE INFORMATION OF NODE NIDi

| FULL-PRECISION VECTOR OF NODE NIDi |
|---|
| R |
| NID & COMPRESSION VECTOR OF NEIGHBOR NODE #1 |
| NID & COMPRESSION VECTOR OF NEIGHBOR NODE #2 |
| ⋮ |
| NID & COMPRESSION VECTOR OF NEIGHBOR NODE #R |

GENERATION METHOD, SEARCH METHOD, AND GENERATION DEVICE

CROSS-REFERENCE TO RELATED APPLICATIONS

This application is based upon and claims the benefit of priority from Japanese Patent Application No. 2024-010798, filed on Jan. 29, 2024, the entire contents of which are incorporated herein by reference.

FIELD

Embodiments described herein relate generally to a generation method, a search method, and a generation device.

BACKGROUND

As one of graph-based approximate nearest neighbor search algorithms, an algorithm called Disk-based Approximate Nearest Neighbor search (DiskANN) has been known. According to DiskANN, a directed graph is created such that multi-dimensional vectors of a multi-directional vector group that is a range of search is recognized as nodes of the directed graph, and index information generated based on a structure of the directed graph is stored in a storage device. A search operation along the directed graph is performed based on the index information stored in the storage device.

BRIEF DESCRIPTION OF THE DRAWINGS

FIG. 8 is a flowchart illustrating an example of an operation of the search device according to the embodiment;

FIG. 9 is a diagram illustrating an example of a configuration of node information according to a first modification; and FIG. 10 is a diagram illustrating an example of a configuration of node information according to a second modification.

DETAILED DESCRIPTION

According to the present embodiment, the generation method is implemented by a processor configured to perform processing on data represented by a directed graph. The generation method includes setting and writing. The setting is to set one of multiple first nodes as a second node. The multiple first nodes are included in the directed graph and are each assigned with an ID. The multiple first nodes respectively correspond to multiple first vectors included in a search range. The writing is to write an information piece that is an element related to the second node out of elements of index information corresponding to the directed graph. The information piece includes a second vector that is a first vector corresponding to the second node out of the multiple first vectors. The information piece includes an ID and a third vector for each of one or more third nodes. The third nodes are all out-neighbor nodes of the second node out of the multiple first nodes. The third vector corresponds to one of the third nodes.

Hereinafter, a generation method, a search method, and a generation device according to embodiments will be described in detail with reference to the accompanying drawings. Note that the present invention is not limited by this embodiment.

Embodiment

Figure 1:
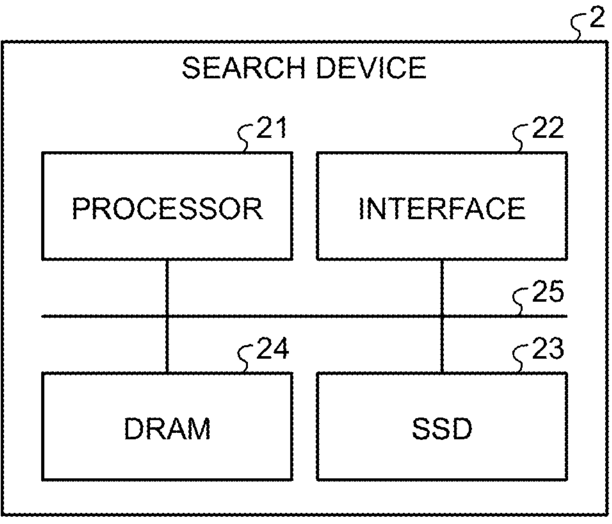
FIG. 1 is a schematic diagram illustrating an example of a configuration of a search device according to an embodiment.

An example of a device (referred to as a search device) on which a search method of an embodiment is executed will be described. FIG. 1 is a schematic diagram illustrating an example of a configuration of a search device according to an embodiment.

In the example illustrated in FIG. 1, a search device 2 includes a processor 21, an interface 22, a solid state drive (SSD) 23, a dynamic random access memory (DRAM) 24, and a bus 25. The processor 21, the interface 22, the SSD23, and the DRAM 24 are electrically connected to the bus 25.

The interface 22 is a device that serves to input and output information to and from the search device 2. The interface 22 includes an interface for communication via a network, an interface to which a storage device can be connected, an interface to which an input device such as a keyboard can be connected, and the like. The search device 2 can receive an input of a query via the interface.

The SSD 23 is a large-capacity nonvolatile memory device that functions as a storage device in the search device 2. The SSD 23 includes a NAND flash memory as a storage device. Note that the storage device applicable to the search device 2 is not limited to the SSD. The search device 2 may include a magnetic disk device as a storage device. An example of the magnetic disk device is a hard disk drive (HDD).

The DRAM 24 is a memory that operates at a higher speed than the storage device. The DRAM 24 functions as a cache region, a buffer region, a work region, or the like. Note that the memory applicable to the search device 2 and operating at a higher speed than the storage device is not limited to the DRAM (24).

The processor 21 is an arithmetic device capable of executing a computer program and implements a function defined by the computer program. The processor 21 is, for example, a central processing unit (CPU). Note that one or more processors 21 may be provided depending on a function(s) to be implemented. In the search device 2, the processor 21 executes a search program (a search program SPG to be described later) to perform a search operation according to the DiskANN. The search program SPG is stored in, for example, the SSD 23, or an external device located outside the search device 2. The processor 21 loads the search program SPG from the SSD 23 or the external device into the DRAM 24 under the environment provided by the operating system. The processor 21 executes the search program SPG loaded in the DRAM 24.

The search operation is an operation of determining data that is closest to the query in a group of data. Each piece of data has N (where N is an integer of 1 or more) elements. In other words, each piece of data is an N-dimensional vector. Each piece of data is an image, a document, or any other type of data, or data generated from these data. In one example, each piece of data represents N feature amounts extracted from an image. The number of elements N is common to all pieces of data and a query to be described later. Hereinafter, the data is referred to as a vector or a full-precision vector. In addition, a group of data (i.e., vectors) as a search range is referred to a vector set.

For the vector set, a directed graph in which each vector constituting the vector set is recognized as a node is generated in advance. In the search operation, the processor 21 searches for a vector closest to the query along the directed graph.

A technique to be compared with the embodiment will be described. The technique to be compared with the embodiment of the present disclosure is referred to a comparative example. According to the comparative example, a compression vector (or compressed vector) is generated for each vector included in the vector set, and the compression vectors for all the vectors included in the vector set are stored in the DRAM. In short, a set of compression vectors corresponding to the vector set is stored in the DRAM. The configuration of the directed graph generated from the vector set is recorded in the index information. A search route is selected node by node in accordance with the directed graph defined by the index information. Every time a search route is selected, a necessary compression vector is selected from the compression vectors for all vectors stored in the DRAM, and a next search route is selected based on a result of distance calculation using the selected necessary compression vector.

In the above-described comparative example, high-speed search operation can be performed, whereas a DRAM with a very large capacity is required. The usage amount of the DRAM increases with the number of vectors in the search range.

In contrast, according to an embodiment of the present disclosure, a compression vector required for distance calculation is recorded in the index information in order to reduce the usage amount of the DRAM.

Figure 2:
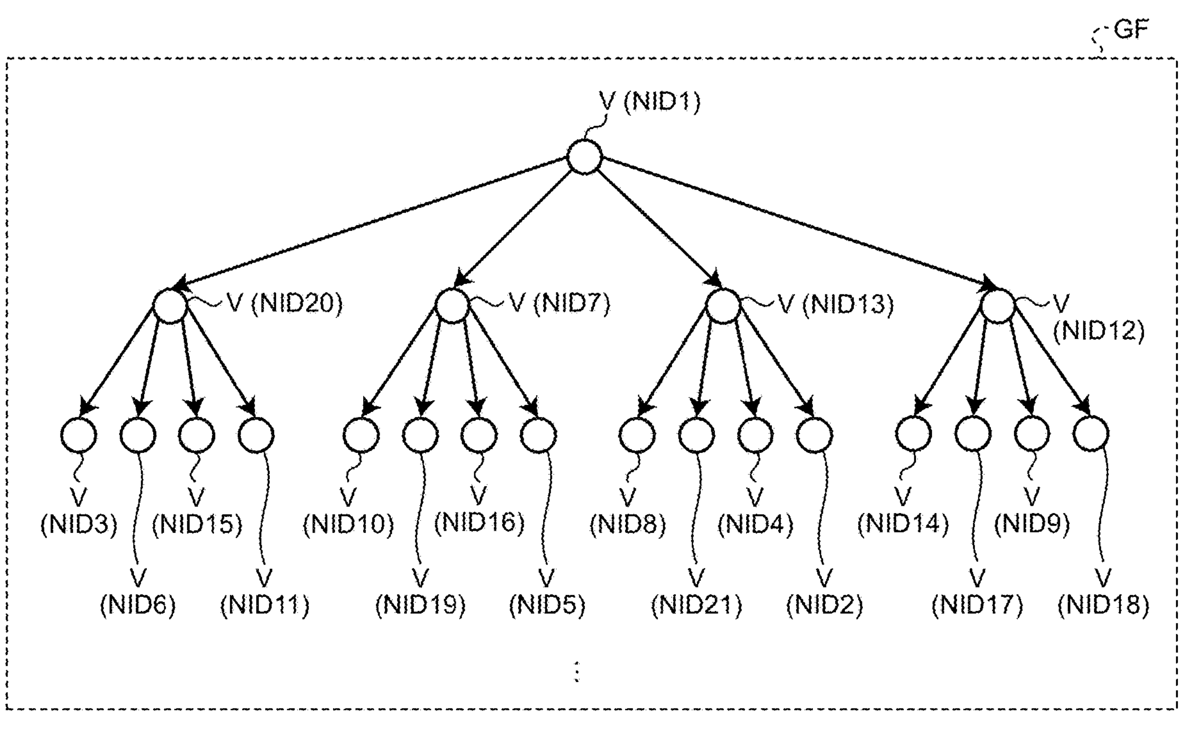
FIG. 2 is a diagram for describing a configuration of a directed graph and index information according to the embodiment.
Figure 2:
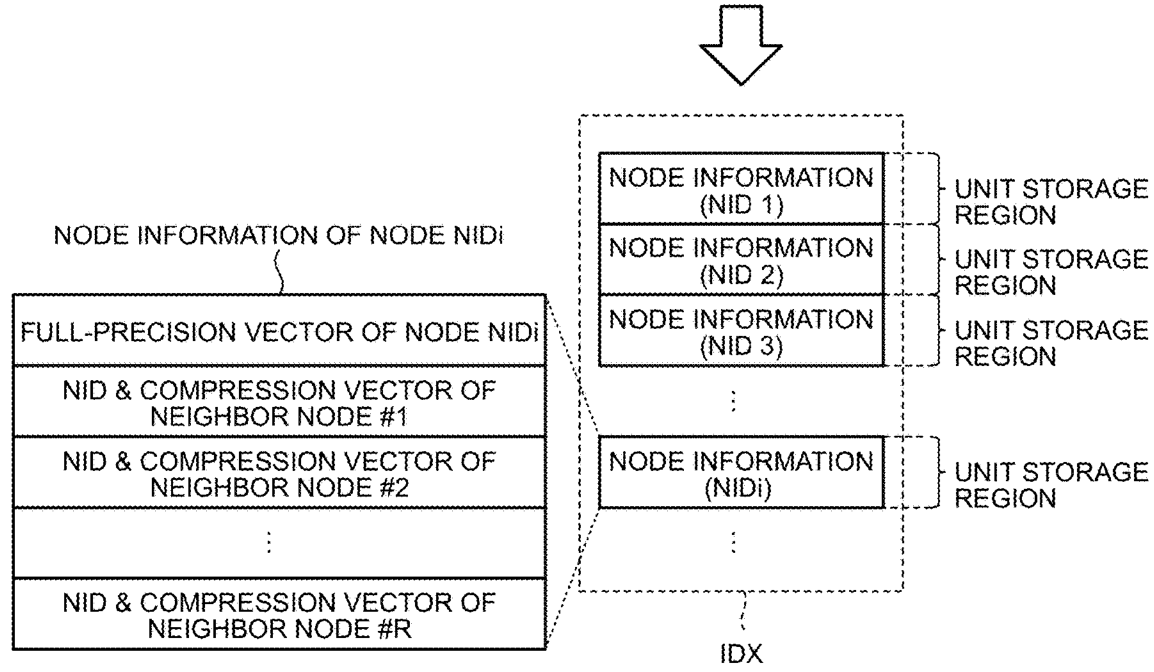

FIG. 2 is a diagram for describing a configuration of a directed graph GF and index information IDX according to the embodiment.

A node ID (hereinafter, simply referred to as NID) is assigned to each vector V included in a vector set. A method of assigning the NID to each vector V is not limited to a specific method. Hereinafter, a vector V (namely, a node) whose node ID is assigned with x (where x is numerical value information) will be referred to a node NIDx.

In FIG. 2, a directed graph GF generated from a vector set is illustrated. In this example, an edge directed to the node NID20 as a head, an edge directed to the node NID7 as a head, an edge directed to the node NID13 as a head, and an edge directed to the node NID12 as a head are connected to the node NID1 as a tail. An edge directed to the node NID3 as a head, an edge directed to the node NID6 as a head, an edge directed to the node NID15 as a head, and an edge directed to the node NID11 as a head are connected to the node NID20 as a tail. An edge directed to the node NID10 as a head, an edge directed to the node NID19 as a head, an edge directed to the node NID16 as a head, and an edge directed to the node NID5 as a head are connected to the node NID7 as a tail. An edge directed to the node NID8 as a head, an edge directed to the node NID21 as a head, an edge directed to the node NID4 as a head, and an edge directed to the node NID2 as a head are connected to the node NID13 as a tail. An edge directed to the node NID14 as a head, an edge directed to the node NID17 as a head, an edge directed to the node NID9 as a head, and an edge directed to the node NID18 as a head are connected to the node NID12 as a tail.

When the node NIDA and the node NIDB are connected by an edge directed to the node NIDB as a head, the node NIDB is referred to as an out-neighbor node of the node NIDA. The number of neighbor nodes of the node NIDA is referred to as an out-degree of the node NIDA. In the present specification, the out-neighbor node is referred to as a neighbor node.

In the example illustrated in FIG. 2, the directed graph GF has a dendritic shape. The shape of the directed graph GF is not limited to a dendritic shape. The out-degree may not be common among nodes. Multiple nodes may be connected in an annular form. In many nodes, the out-degree is greater than or equal to one, but there may be a node having an out-degree of zero. In the embodiment, in order to simplify the description, a case will be described in which the out-degree is greater than or equal to one in all the nodes and the out-degree is common in all the nodes.

In the search operation, the processor 21 performs an operation of searching for a node closest to the query based on an optional search algorithm according to the directed graph GF defined by the index information IDX. As the calculation algorithm for the search, an optional algorithm including Greedy search, Beam search, and the like can be adopted. Briefly describing one example, the processor 21 sequentially switches the search target node as a candidate for a node closest to the query among the nodes along the directed graph GF. Each time the search target node is switched, the processor 21 calculates a distance between each neighbor node of the search target node and the query. Then, the processor 21 sets a node closest to the query out of the one or more neighbor nodes of one or more search target nodes close to the query at the current time point as a next new search target node. The processor 21 sequentially switches the search target node along the directed graph GF until reaching the vector V estimated to be the closest to the query. The process of switching the search target node along the directed graph GF may be referred to as a "hop operation".

In the present specification, the distance refers to a measure that represents similarity between pieces of data (including vector and query). Mathematically, the distance may be a Euclidean distance. Note that the mathematical definition of the distance is not limited to the Euclidean distance. In addition, the index used for the evaluation of the distance is not limited to the Euclidean distance or the like, and any index can be used as long as it corresponds to the distance.

The processor 21 refers to the index information IDX corresponding to the directed graph GF in order to identify each neighbor node of the search target node. The index information IDX has a data structure that is capable of deriving the structure of the directed graph GF.

The index information IDX is a set of node information. Each piece of node information is an information piece that is an element of the index information IDX. Each piece of node information corresponds to a node on a one-to-one basis. The index information IDX has a structure in which all pieces of node information are arrayed in the order of NID.

All pieces of node information have a common configuration. A configuration of node information about a node NIDi will be described as a representative of all pieces of node information.

The node information about the node NIDi includes a vector (namely, a full-precision vector) of the node NIDi. In addition, the node information about the node NIDi includes NID and compression vectors for all neighbor nodes of the node NIDi. The compression vector is a vector generated from the full-precision vector to which the node NIDi is assigned. When the out-degree of each node is expressed by R, the node information about the node NIDi includes the NID and the compression vector for each of the R neighbor nodes.

The compression vector is generated by compressing the full-precision vector. The compression algorithm is not limited to a specific algorithm. In one example, direct product quantization (Product Quantization) is used as the compression algorithm.

Figure 3:
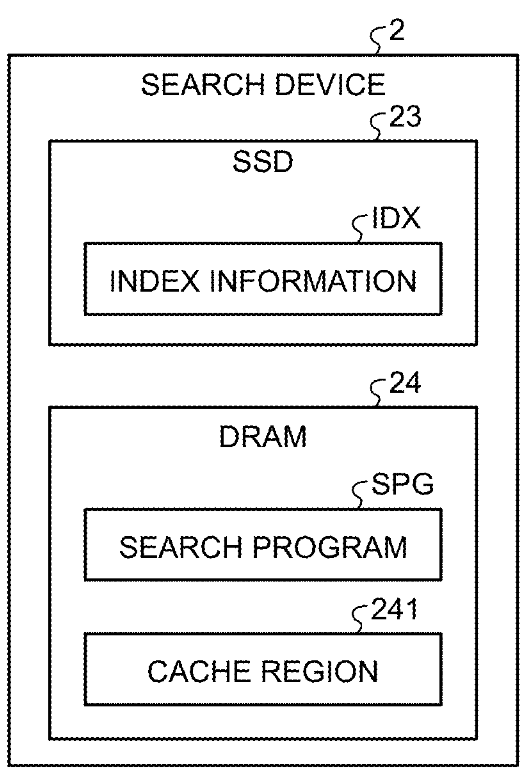
FIG. 3 is a schematic diagram for describing an example of information stored in an SSD and a DRAM when the search device according to the embodiment executes a search.

FIG. 3 is a schematic diagram for describing an example of information stored in an SSD 23 and a DRAM 24 when the search device 2 according to the embodiment executes a search.

The index information IDX illustrated in FIG. 2 is stored in the SSD 23.

A search program SPG is loaded into the DRAM 24. The processor 21 executes a search operation in accordance with the search program SPG loaded in the DRAM 24.

In the DRAM 24, a cache region 241 is allocated. The cache region 241 is a storage region where information necessary for the search operation is temporarily stored.

The processor 21 executes the search operation under the control of the search program SPG. In the search operation, the processor 21 searches for a vector having the closest distance to an externally input query in the vector set.

As described above, the index information IDX has a configuration in which the compression vectors of all the neighbor nodes are recorded in each piece of node information. The processor 21 reads one piece of node information about the search target node from the SSD 23 and stores the read information in the cache region 241 of the DRAM 24. Then, the processor 21 completes one hop operation based on the compression vectors of all the neighbor nodes included in the stored node information. The processor 21 determines a vector having the closest distance to the query by repeating the hop operation.

As described above, according to the embodiment, the index information IDX has a configuration in which the compression vectors of all the neighbor nodes necessary for one hop operation are recorded in each node information. Therefore, it is not necessary to store the compression vectors in the DRAM 24 for all the vectors in the search range. Therefore, a search operation with reduced memory usage amount of the DRAM 24 becomes possible.

When reading the index information IDX under the control according to the search program SPG, the processor 21 issues an IO request for reading from the SSD 23. The storage region of the SSD 23 viewed from the processor 21 under the control according to the search program SPG is subdivided into a plurality of unit storage regions with a common size. The IO request is a request for accessing (reading or writing) a desired one of the unit storage regions. Each of the unit storage region can be considered as a unit of access to the SSD 23. The unit storage region may be a page, a block, a cluster, a sector, or the like in the NAND flash memory, or may be different from any of these. In a case where the SSD 23 includes one or more flash memory dies, one page or part of one page included in a single flash memory die may be set as the unit storage region. In a case where the SSD 23 includes multiple flash memory dies, a group of pages or a group of part of each page included in each of two or more flash memory dies capable of performing data reading simultaneously or in parallel may be set as the unit storage region. In a case where an HDD is provided in the search device 2 as a storage device of the search device 2, instead of the SSD 23, a single region for data storage or continuous regions for data storage in a single data track may be set as the unit storage region. Alternatively, two or more data tracks adjacent to each other from which data can be consecutively read may be set as the unit storage region. The processor 21 can acquire information stored in a target unit storage region of the index information IDX in response to a single IO request.

As illustrated in FIG. 2, in the embodiment, the index information IDX has a configuration that one piece of node information is stored in one unit storage region. With this configuration, only one piece of node information acquired by one IO request is stored in the cache region 241 of the DRAM 24. The processor 21 can acquire the node information necessary for the hop operation in the cache region 241 by one IO request and can acquire only one piece of node information in the cache region 241. Therefore, efficiency of access to the SSD 23 is enhanced and the usage amount of the DRAM24 can be suppressed.

Next, a device (referred to as a generation device 1) that implements a method for generating the index information IDX will be described.

Figure 4:
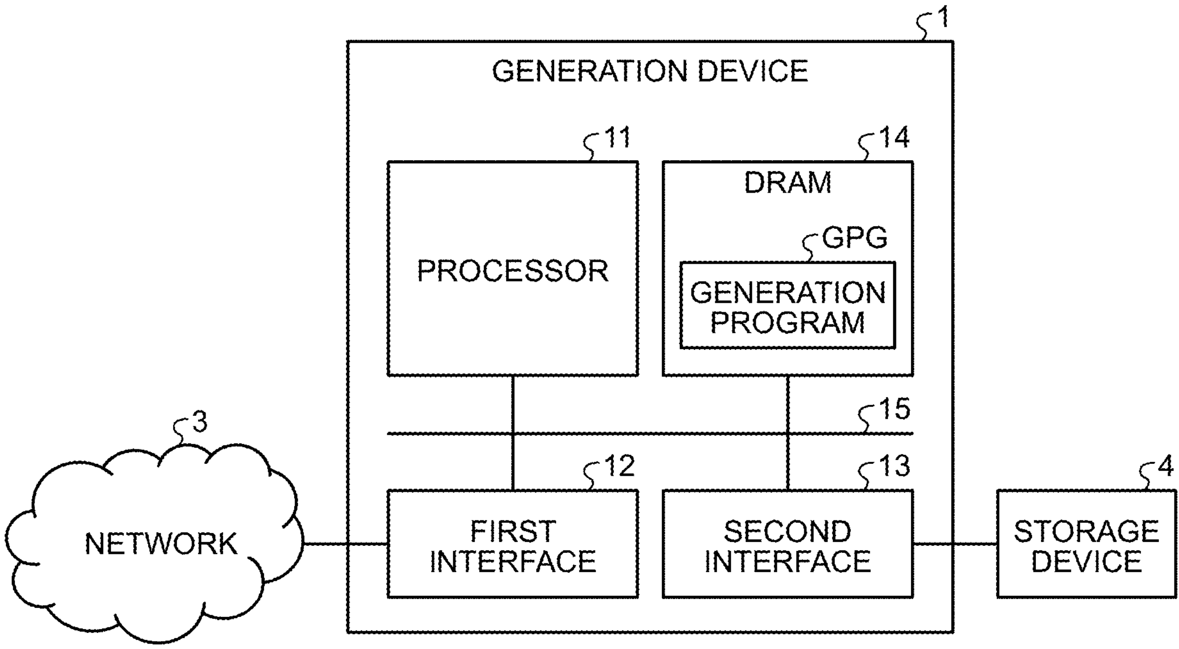
FIG. 4 is a schematic diagram illustrating an example of a configuration of a generation device according to an embodiment.

FIG. 4 is a schematic diagram illustrating an example of a configuration of a generation device 1 according to an embodiment.

The generation device 1 includes a processor 11, a first interface 12, a second interface 13, a DRAM 14, and a bus 15. The first interface 12, the processor 11, the DRAM 14, and the second interface 13 are electrically connected to the bus 15.

The first interface 12 is a circuit that receives data from an external device located outside the generation device 1. In this example, the first interface 12 is a device for performing communication with the external device via the network 3. The first interface 12 is, for example, an Ethernet™ adapter, a Wi-Fi™ adapter, or the like.

The second interface 13 is a circuit that outputs data to an external device. In this example, the second interface 13 is an adapter for connecting to the storage device 4. The type of the storage device 4 is not limited to a specific type. The storage device 4 may be, for example, an SSD, an HDD, a universal flash storage (UFS) device, or the like.

The processor 11 is an arithmetic device having a function of generating the index information IDX. The processor 11 may be, for example, a CPU. In a case where the processor 11 is a CPU, the processor 11 implements a function of generating the index information IDX by executing a particular program. Specifically, the processor 11 acquires the generation program GPG from a certain position, and loads the acquired generation program GPG into the DRAM 14. Then, the processor 11 executes the generation program GPG loaded in the DRAM 14. The processor 11 generates the index information IDX under the control of the generation program GPG. Note that one or more processors 11 may be provided depending on a function(s) to be implemented.

In the example illustrated in FIG. 4, the generation device 1 receives data from an external device via the network 3 and the first interface 12, and outputs the data to the external device (here, the storage device 4) via the second interface 13. The reception of data and the output of data may be executed via the same interface. In addition, the generation device 1 may include a storage device, and may acquire data from the storage device or output data to the storage device.

In addition, in the example illustrated in FIG. 4, the generation device 1 is assumed to be a device different from the search device 2. The search device 2 may function as the generation device 1 by executing the generation program GPG in the search device 2.

Figure 5:
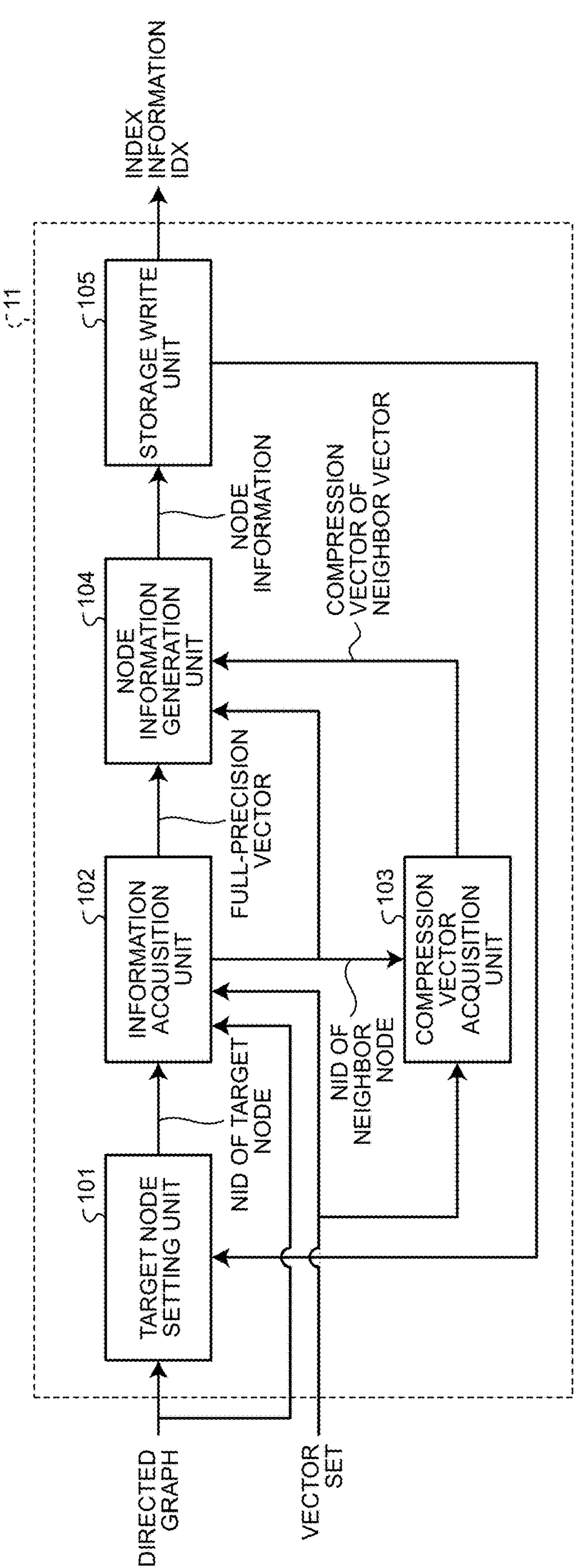
FIG. 5 is a schematic diagram illustrating an example of functions implemented by a processor included in the generation device according to the embodiment.

FIG. 5 is a schematic diagram illustrating an example of functions implemented by the processor 11 included in the generation device 1 according to the embodiment.

The processor 11 functions as a target node setting unit 101, an information acquisition unit 102, a compression vector acquisition unit 103, a node information generation unit 104, and a storage write unit 105.

The processor 11 may acquire the directed graph GF and the vector set over the network 3 though the first interface 12.

The target node setting unit 101 sets one node as a target node out of nodes in the acquired directed graph GF. The index information IDX is generated by repeatedly executing a loop process of generating one piece of node information. The target node is a node that is temporarily set as a target for generating node information in one loop process.

The target node setting unit 101 transmits the NID of the target node to the information acquisition unit 102.

Upon recognizing the target node based on the NID received from the target node setting unit 101, the information acquisition unit 102 acquires the NIDs of all the neighbor nodes of the target node from the directed graph GF. Then, the information acquisition unit 102 transmits the acquired NIDs of all the neighbor nodes to the compression vector acquisition unit 103 and the node information generation unit 104.

In addition, the information acquisition unit 102 acquires the full-precision vector of the target node from the vector set. Then, the information acquisition unit 102 transmits the acquired full-precision vector of the target node to the node information generation unit 104.

The compression vector acquisition unit 103 acquires the full-precision vector of the neighbor node from the vector set, and performs compression on the acquired full-precision vector. As described above, the compression algorithm is not limited to a specific algorithm. The compression vector acquisition unit 103 acquires compression vectors for all the neighbor nodes of the target node, and transmits the acquired compression vectors of all the neighbor nodes to the node information generation unit 104.

Note that the compression vector is not necessarily generated by the compression vector acquisition unit 103. A compression vector may be prepared in advance for each full-precision vector included in the vector set, and the compression vector acquisition unit 103 may acquire the compression vector via the network 3 and the first interface 12.

The node information generation unit 104 generates node information about the target node. The node information includes the full-precision vector of the target node, the NIDs of all the neighbor nodes of the target node, and the compression vectors of all the neighbor nodes of the target node. The node information generation unit 104 transmits the generated node information about the target node to the storage write unit 105.

The storage write unit 105 writes the node information about the target node to the storage device 4 via the second interface 13. Specifically, the storage write unit 105 writes the node information about the target node to an area corresponding to a unit storage region of a storage destination in the storage device (for example, the SSD 23 of the search device 2). The storage device 4 is provided with two or more areas each corresponding to a different one of unit storage regions. The storage write unit 105 writes pieces of node information about different nodes to the corresponding areas, thereby completing the index information IDX in the storage device 4. With the index information IDX written in this manner, when the index information IDX is transferred to the SSD 23, each piece of node information is stored in a different unit storage region.

Note that some of or all the target node setting unit 101, the information acquisition unit 102, the compression vector acquisition unit 103, the node information generation unit 104, and the storage write unit 105 may be implemented by a hardware circuit such as a field-programmable gate array (FPGA) or an application specific integrated circuit (ASIC).

Figure 6:
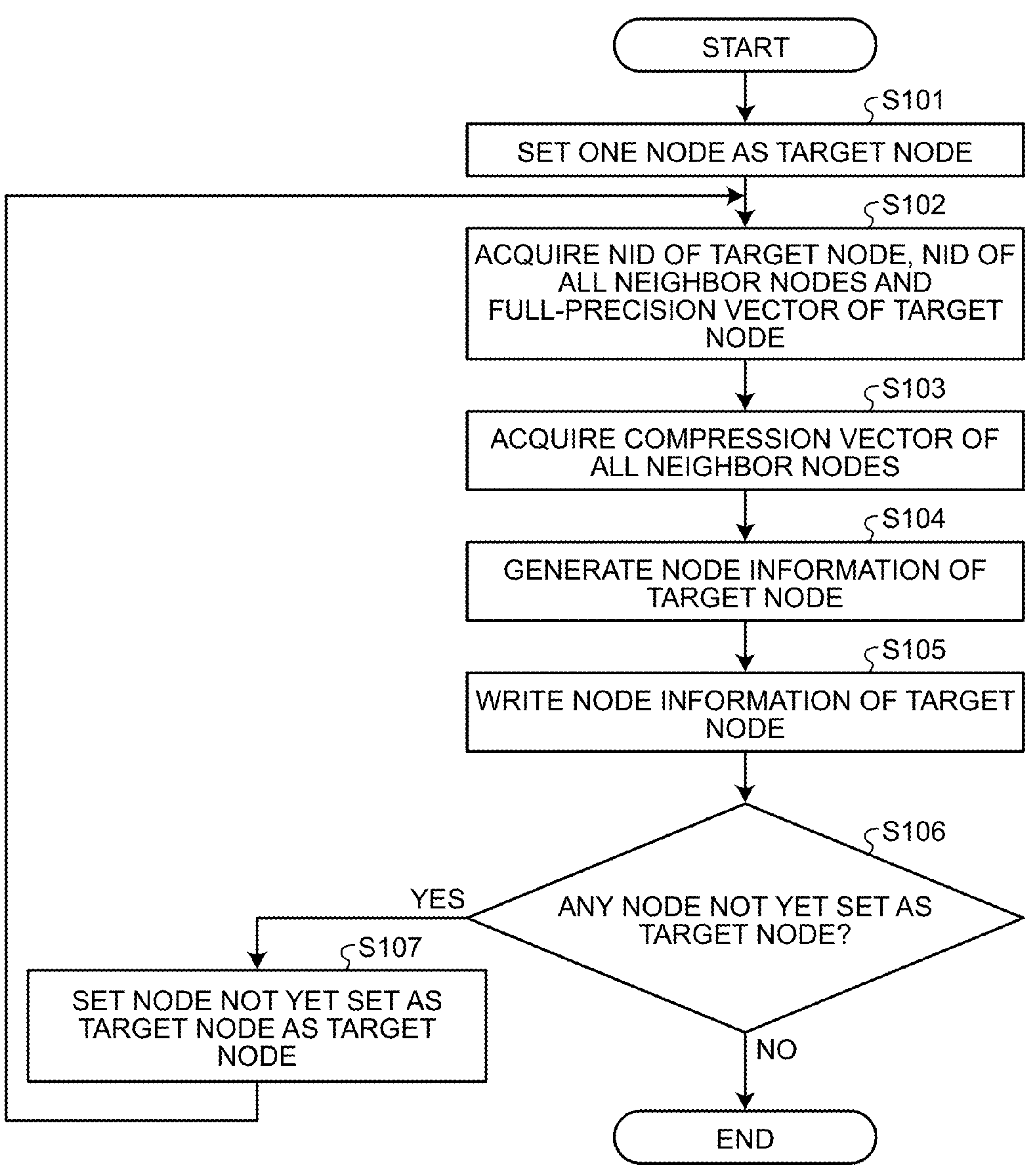
FIG. 6 is a flowchart illustrating an example of an operation of the generation device according to the embodiment.

FIG. 6 is a flowchart illustrating an example of an operation of the generation device 1 according to the embodiment.

First, the target node setting unit 101 sets one node as a target node based on the directed graph GF (S101). A method of setting the target node is not limited to a specific method. In one example, the target node setting unit 101 may set the target node in order of NID.

The information acquisition unit 102 acquires the NID of the target node, the NIDs of all the neighbor nodes of the target node, and the full-precision vector of the target node (S102). The information acquisition unit 102 recognizes the target node by receiving the NID of the target node from the target node setting unit 101. The information acquisition unit 102 acquires the NIDs of all the neighbor nodes of the target node from the directed graph GF. The information acquisition unit 102 acquires the full-precision vector of the target node from the vector set.

The information acquisition unit 102 may acquire the NIDs of all the neighbor nodes of the target node over the network 3 through the first interface 12. Alternatively, the directed graph GF may be transferred to the DRAM 14 via the network 3 and the first interface 12, and thereafter, the information acquisition unit 102 may acquire the NIDs of all the neighbor nodes of the target node from the directed graph GF stored in the DRAM 14.

Similarly, the information acquisition unit 102 may acquire the full-precision vector of the target node via the network 3 and the first interface 12. Alternatively, the vector set may be transferred to the DRAM 14 via the network 3 and the first interface 12, and then the information acquisition unit 102 may acquire the full-precision vector of the target node from the vector set stored in the DRAM 14.

The compression vector acquisition unit 103 acquires the compression vectors of all the neighbor nodes of the target node based on the NIDs of all the neighbor nodes of the target node (S103).

The node information generation unit 104 generates node information about the target node (S104). The node information generation unit 104 generates, as node information about the target node, an information piece that includes the full-precision vector of the target node, the NIDs of all the neighbor nodes of the target node, and the compression vectors of all the neighbor nodes of the target node.

The storage write unit 105 writes the generated node information about the target node to an area corresponding to a unit storage region of a storage destination in the storage device (for example, the SSD 23 of the search device 2) (S105).

The target node setting unit 101 determines whether there is a node that has not been set as a target node among nodes included in the directed graph GF (S106). In response to determining that there is a node not yet been set as the target node (S106: Yes), the target node setting unit 101 sets a node that has not been set as the target node as the target node (S107), and the control transitions to S102.

In response to determining that there is no node not yet been set as the target node (S106: No), the operation of the generation device 1 ends.

Figure 7:
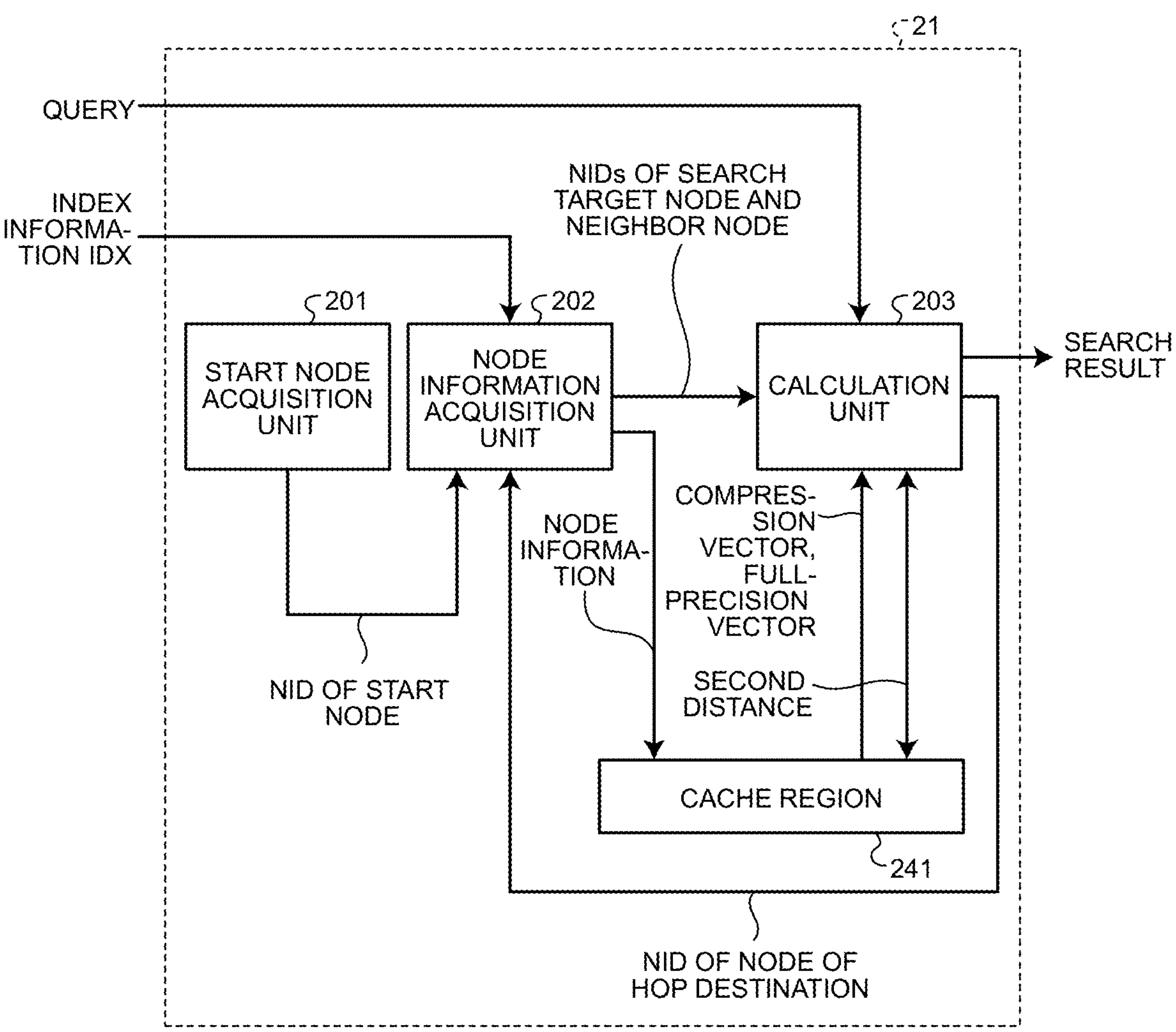
FIG. 7 is a schematic diagram illustrating an example of functions implemented by a processor included in the search device according to the embodiment.

FIG. 7 is a schematic diagram illustrating an example of functions implemented by the processor 21 included in the search device 2 according to the embodiment.

The processor 21 functions as a start node acquisition unit 201, a node information acquisition unit 202, and a calculation unit 203.

The start node acquisition unit 201 acquires the NID of a start node. Then, the start node acquisition unit 201 transmits the acquired NID of the start node to the node information acquisition unit 202.

A method of acquiring the NID of the start node is not limited to a specific method. The start node acquisition unit 201 may recognize a node having the smallest numerical value of the NID as the start node and acquire the node information about the start node from the index information IDX. The NID of the start node may be given from the outside of the search device 2, or the NID of the start node may be stored in advance in the SSD 23, and the start node acquisition unit 201 may acquire the given NID or the stored NID.

As described above, in the search operation, the hop operation is executed such that the search target node is sequentially switched along the directed graph GF defined by the index information IDX. The start node is a node that is set as a search target node in the initial hop operation. The node information acquisition unit 202 and the calculation unit 203 start the initial hop operation after recognizing the start node as the search target node in the initial hop operation.

The node information acquisition unit 202 acquires the node information about the search target node from the index information IDX stored in advance in the SSD 23. Note that, at a stage before executing the initial hop operation, a node indicated by the NID received from the start node acquisition unit 201 is recognized as the search target node. After the initial hop operation is executed, a node indicated by the NID received from the calculation unit 203 is recognized as the search target node.

The node information acquisition unit 202 stores the acquired node information in the cache region 241. In addition, the node information acquisition unit 202 transmits the NID of the search target node and the NIDs of all the neighbor nodes of the search target nodes to the calculation unit 203.

The calculation unit 203 acquires, from the cache region 241, the compression vector and the full-precision vector of the search target node and the compression vectors of all the neighbor nodes. Then, the calculation unit 203 calculates the distance to the query for each of the search target node and all the neighbor nodes of the search target node, based on the compression vector of each node. The distance obtained by calculation using such a compression vector is referred to as a first distance.

Note that the compression vector of the current search target node is not included in node information about the current search target node. The compression vector of the current search target node is included in node information about a previous search target node as a compression vector of one neighbor node of the previous search target node. Therefore, in each hop operation, at least a compression vector of the node at the hop destination out of compression vectors of all the neighbor nodes included in the node information about the search target node is kept in a valid state in the cache region 241. In other words, in one hop operation, in addition to the node information about the current search target node, the compression vector of the current search target node included in the node information about the previous search target node can be acquired from the cache region 241.

Data in the cache region 241 being "valid" refers to a state where the data can be read. Data in the cache region 241 being "invalid" refers to a state where the data cannot be read from the cache region 241. The data in the cache region 241 being "invalid" specifically indicates that the data is erased from the cache region 241 or the position where the data is stored is made usable to store another data.

The calculation unit 203 determines whether or not to end the hop operation on the basis of the first distance calculated for each of the search target node and all the neighbor nodes of the search target node. If the first distance from the search target node to the query is shorter than the first distance from any neighbor node of the search target node to the query, the calculation unit 203 determines to end the hop operation. When there is a neighbor node whose first distance to the query is shorter than the first distance from the search target node to the query, the calculation unit 203 determines not to end the hop operation. Note that the method for determining whether or not to end the hop operation is not limited thereto.

In response to determining not to end the hop operation, the calculation unit 203 further determines a node of a hop destination (or a next hop) from among all the neighbor nodes of the search target node. Specifically, the calculation unit 203 determines, as the hop destination, a neighbor node whose first distance is the shortest among all the neighbor nodes of the search target node. The calculation unit 203 transmits the NID of the determined node of the hop destination to the node information acquisition unit 202.

In addition, the calculation unit 203 calculates the distance from the search target node to the query by using the full-precision vector of the search target node. A distance obtained by calculation using the full-precision vector is referred to as a second distance. The calculation unit 203 stores the second distance in the cache region 241.

Until the hop operation is ended, the second distances of all the nodes on the path of the hop operation are stored in the cache region 241 in a valid state. When the hop operation is determined to be ended, the calculation unit 203 determines a node closest to the query from among all the nodes on the hop path based on the second distances of all the nodes on the hop path. Then, the calculation unit 203 outputs information indicating the determined node as a search result.

The search result output by the calculation unit 203 is not limited to specific information as long as it corresponds to the node determined as the node closest to the query. In one example, the calculation unit 203 can output, as the search result, the NID or the full-precision vector of the node determined as the node closest to the query. In the present embodiment, it is assumed that the calculation unit 203 outputs, as the search result, a full-precision vector of the node determined as the node closest to the query.

Some of or all the start node acquisition unit 201, the node information acquisition unit 202, and the calculation unit 203 may be implemented by a hardware circuit such as FPGA or ASIC.

FIG. 8 is a flowchart illustrating an example of an operation of the search device 2 according to the embodiment.

When the calculation unit 203 acquires the query (S201), the start node acquisition unit 201 acquires NID of a start node (S202). Upon recognizing the start node by the NID of the start node, the node information acquisition unit 202 sets the start node as a search target node (S203).

The node information acquisition unit 202 reads the node information about the search target node in the index information IDX from the SSD 23 and stores the read node information about the search target node in the cache region 241 (S204).

The calculation unit 203 calculates a distance (first distance) between: the query, and each of the search target node and all the neighbor nodes of the search target node (S205). In S205, the calculation unit 203 calculates the first distance for each node by using the compression vector of the search target node and the compression vectors of all the neighbor nodes of the search target node included in the node information stored in the cache region 241.

In addition, the calculation unit 203 calculates the distance (second distance) between the search target node and the query by using the full-precision vector of the search target node included in the node information stored in the cache region 241 (S206).

The calculation unit 203 determines whether or not to end the hop operation (S207). In response to determining not to end the hop operation (S207: No), the calculation unit 203 further determines a node of a hop destination (S208). The calculation unit 203 determines a node of a hop destination based on the first distance related to each node calculated by the process of S205.

The calculation unit 203 stores the second distance related to the search target node in the cache region 241 (S209). The process of S209 may be executed after the process of S206 and before the process of S207. Then, the calculation unit 203 invalidates the data in the cache region 241, except for the second distance for each node on the hop path and the compression vector of the hop destination (S210).

The NID of the node of the hop destination is transmitted from the calculation unit 203 to the node information acquisition unit 202, and the node information acquisition unit 202 sets the node of the hop destination as the search target node (S211). Then, the control transitions to S204.

Note that, when the control transitions to S204 after passing through S211, the first distance between a new search target node and the query has already been obtained by the process of S205 executed last time. Therefore, the calculation unit 203 may omit the calculation of the first distance between the new search target node and the query in the process of S205.

In response to determining to end the hop operation (S207: Yes), the calculation unit 203 determines a node closest to the query based on the second distance for each node on the hop path (S212). Then, the calculation unit 203 outputs the full-precision vector of the determined node as a search result (S213), and the operation of the search device 2 ends.

As described above, according to the embodiment, the generation device 1 sets one of the nodes included in the directed graph GF as the target node (for example, S101 and S107 in FIG. 6). The generation device 1 writes node information including the full-precision vector of the target node in the vector set and the compression vector generated by compressing the ID and the corresponding full-precision vector for each of all the neighbor nodes of the target node in the vector set (for example, S102 to S105 in FIG. 6).

The index information IDX generated as described above has a configuration that the compression vectors of all the neighbor nodes necessary for one hop operation are recorded in each piece of node information. Therefore, it is not necessary to store the compression vectors in the DRAM for all the vectors in the search range. Therefore, a search operation with reduced memory usage amount becomes possible.

In addition, according to the embodiment, the generation device 1 executes, multiple times, a loop process (for example, S102 to S107 in FIG. 6) including setting of a target node and writing of node information about the target node. Every time the loop process is performed, the generation device 1 writes the node information to different areas among multiple areas of the storage device 4, each corresponding to a unit of access to the storage device (namely, a unit storage region).

Therefore, at the time of the search operation, the processor 21 of the search device 2 can acquire, by one IO request to the storage device (e.g. SSD 23), only the node information necessary for the hop operation in the index information IDX. Thus, it is possible to improve the efficiency of access to the storage device in the search operation.

Moreover, according to the embodiment, the search device 2 acquires a query (for example, S201 in FIG. 8). The search device 2 sets a search target node that is a candidate for a node closest to the query along the directed graph GF defined by the index information IDX (for example, S203, S208, and S211 in FIG. 8). Every time the search target node is set, the search device 2 reads the node information about the search target node from the SSD 23 which is a storage device, stores the read node information about the search target node in the DRAM 24 which is a memory of which an access operation is faster than that of the storage device (for example, S204 in FIG. 8), determines a node of a hop destination based on compression vectors of all neighbor nodes included in the node information about the search target node stored in the DRAM 24 (for example, S205 and S208 in FIG. 8), and sets the node of the hop destination as a new search target node (for example, S211 in FIG. 8).

Therefore, it is possible to execute each hop operation without storing the compression vector in the DRAM for all the vectors in the search range. Thus, a search operation with reduced memory usage amount becomes possible.

In addition, according to the first embodiment, the search device 2 calculates the second distance using the full-precision vector included in the node information about the search target node stored in the DRAM 24 (for example, S206 in FIG. 8). The search device 2 determines a vector closest to the query based on the second distance of each node that has been set as the search target node, that is, the second distance of each node on the hop path (for example, S212 in FIG. 8).

Therefore, it is possible to execute each hop operation without storing the compression vector in the DRAM for all the vectors in the search range. Thus, a search operation with reduced memory usage amount becomes possible.

Some modifications of the embodiment will be described below. In each modification, matters different from the embodiment will be described. The same matters as those in the embodiment will not be described or will be briefly described.

First Modification

In the first modification, the node information generation unit 104 generates, as node information, an information piece to which the compression vector of the target node is added in addition to the full-precision vector of the target node, and the ID and the compression vector for each of all the neighbor nodes of the target node. The compression vector of the target node is generated by compressing the full-precision vector of the target node. The compression vector of the target node is acquired by the compression vector acquisition unit 103. The compression vector acquisition unit 103 may acquire the compression vector of the target node from the outside, or may acquire the compression vector of the target node by compressing the full-precision vector of the target node.

FIG. 9 is a diagram illustrating an example of a configuration of node information according to the first modification. FIG. 9 illustrates a configuration of node information about the node NIDi as a representative of all pieces of the node information. As illustrated in FIG. 9, the node information according to the first modification has a configuration in which a compression vector of the node NIDi is added to the node information according to the embodiment illustrated in FIG. 2.

In this way, the individual node information includes the compression vector of the target node in addition to the full-precision vector of the target node, and the IDs and compression vectors of all the neighbor nodes of the target node. Therefore, when each hop operation is completed, the calculation unit 203 of the search device 2 can invalidate all pieces of the node information about the search target node in the cache region 241.

Second Modification

FIG. 10 is a diagram illustrating an example of a configuration of node information according to the second modification. In the drawing, a configuration of the node information about the node NIDi is illustrated as a representative of all pieces of the node information. As illustrated in this figure, the node information according to the second modification has a configuration that the out-degree R of the node NIDi is added to the node information relative to the above-described embodiment illustrated in FIG. 2.

As noted above, one unit storage region stores only one piece of node information. However, the size of the node information does not always match the capacity of the unit storage region. A free region may remain in the unit storage region in which one piece of node information has been stored. Such a free region may be provided with padding. In addition, the out-degree R may be different for each node.

When reading the node information about the search target node from the unit storage region, the node information acquisition unit 202 of the search device 2 needs to determine the end of the node information stored in the unit storage region. According to the second modification, the node information acquisition unit 202 can determine the end of the node information based on the out-degree R included in the node information.

In one example, when the size of the full-precision vector is expressed as $b_{full}$ byte, the size of one compressed vector is expressed as $b_{comp}$ byte, the size of the numerical value information about the NID is expressed as $b_{NID}$ byte, and the size of the numerical value information about the out-degree R is expressed as $b_R$ byte, the size $b_{ND}$ of the node information according to the second modification can be expressed by the following formula (1).

$$b_{ND}=b_{full}+R\times(b_{comp}+b_{NID})+b_R \quad (1)$$

The node information acquisition unit 202 calculates the size $b_{ND}$ of the node information by using Formula (1). Then, the node information acquisition unit 202 acquires, as node information about the search target node, information that is stored in a range from the head position of the unit storage region to a position offset by $b_{ND}$ bytes from the head position.

In the second modification, the out-degree R is additionally recorded in each piece of node information. However, if the out-degree R is common to all the nodes, the out-degree R may be omitted from each piece of node information, and the out-degree R may be stored in the SSD 23 that is a storage device, as a parameter common to all the nodes.

Third Modification

When a designer generates the directed graph GF, the out-degree may be set common to all the nodes, or the out-degree may not be set common to all the nodes. The designer may determine the capacity of the unit storage region after determining the maximum out-degree.

Description will be made with respect to the third modification. When the maximum out-degree is expressed by $R_{max}$, the maximum size $b_{NDmax}$ of the node information can be expressed by the following Formula (2).

$$b_{NDmax}=b_{full}+R_{max}\times(b_{comp}+b_{NID})+b_R \quad (2)$$

The designer calculates the maximum size $b_{NDmax}$ of the node information using Formula (2). Then, the designer sets the maximum size $b_{NDmax}$ of the node information with the capacity of the unit storage region. Then, one piece of node information can be always stored in each unit storage region.

Note that the designer may first determine the capacity of the unit storage region and determine the maximum out-degree based on the capacity of the unit storage region.

In the embodiment, the first modification, the second modification, and the third modification, only one piece of node information is stored in one unit storage region. However, the number of pieces of node information stored in one unit storage region is not limited to one piece. Two or more pieces of node information may be stored in one unit storage region. The size of one piece of node information may be larger than the capacity of the unit storage region, and one piece of node information may be stored in a range over two or more unit storage regions. However, one piece of node information is stored in a logically continuous range of the SSD 23.

The logically continuous range refers to a range that is continuous in the logical address space provided by the storage device to the processor. In general, in a storage device such as an SSD or a magnetic disk device, a response speed in a case where data is read from a logically continuous range is faster than a response speed in a case where data is read from two or more ranges that are not logically continuous. Therefore, the time required to read each piece of node information from the SSD23 is suppressed by storing each piece of node information in a logically continuous range of the SSD 23.

In the description of the embodiment, the first modification, the second modification, and the third modification, the node information includes the compression vector of each neighbor node. The vector of each neighbor node included in the node information is not limited to the compression vector. The node information may include the full-precision vector of each neighbor node instead of the compression vector of each neighbor node or in addition to the compression vector of each neighbor node.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A generation method implemented by a computer including a first interface configured to receive a directed graph, a processor configured to perform processing on data represented by the directed graph, and a second interface configured to output data based on the processing, the method comprising:

receiving the directed graph via the first interface;

setting one of multiple first nodes as a second node, the multiple first nodes being included in the directed graph and each being assigned with an ID, the multiple first nodes respectively corresponding to multiple first vectors included in a search range;

writing an information piece being an element related to the second node out of elements of index information corresponding to the directed graph, the information piece being written via the second interface to a storage device connected to the computer, the information piece including a second vector being a first vector corresponding to the second node out of the multiple first vectors, and an ID and a third vector for each of one or more third nodes, the third nodes being all out-neighbor nodes of the second node out of the multiple first nodes, the third vector corresponding to one of the third nodes; and executing multiple times of first operations, each of the multiple times of first operations including the setting and the writing, wherein the writing in each of the multiple times of first operations is performed by writing the information piece to a different storage region among multiple storage regions in the storage device, and each of the multiple storage regions corresponds to a unit of access to the storage device.

2. The generation method according to claim 1, wherein the third vector includes the first vector corresponding to the third node, or a vector generated by compressing the first vector corresponding to the third node.

3. The generation method according to claim 1, wherein the setting in each of the multiple times of first operations includes setting, as the second node, a first node not yet been set as the second node out of the multiple first nodes, and the multiple times of first operations are executed until there is no first node not yet been set as the second node.

4. The generation method according to claim 1, wherein the writing includes adding, to the information piece, information about the number of out-neighbor nodes of the second node.

5. The generation method according to claim 1, wherein the writing includes adding, to the information piece, a fourth vector generated by compressing the second vector.

6. The generation method according to claim 1, wherein the writing includes generating the information piece in which the second vector is arranged at a head.

7. The generation method according to claim 1, wherein the information piece includes no ID of the second vector.

8. A search method implemented by a computer including a processor, a storage device, and a memory configured to operate faster than the storage device, the method comprising:

acquiring a query; and setting a candidate of a first node closest to the query along a directed graph defined by index information, the directed graph including multiple first nodes corresponding to multiple first vectors included in a search range, the index information being stored in the storage device and including multiple first information pieces, each of the multiple first information pieces including a second vector being a first vector corresponding to one first node out of the multiple first vectors, and an ID and a third vector for each of one or more second nodes, the second nodes being all out-neighbor nodes of the one first node of the multiple first nodes, the third vector being a vector corresponding to the second node, wherein the setting of the candidate includes:

reading a second information piece from a storage region of the storage device and storing the second information piece in the memory, the second information piece being the first information piece related to a third node that is the first node as the candidate, the storage region corresponding to a unit of access to the storage device; and setting the first node as a new candidate based on one or more of the third vectors included in the second information piece stored in the memory.

9. The search method according to claim 8, wherein the third vector includes the first vector corresponding to the second node, or a vector generated by compressing the first vector corresponding to the second node.

10. The search method according to claim 8, further comprising:

after the second information piece is stored in the memory, calculating a distance between the first node as the candidate and the query by using the first vector included in the stored second information piece; and determining a vector closest to the query based on the distances between each of the first nodes having been set as the candidate and the query.

11. The search method according to claim 8, wherein the storage device includes a NAND flash memory and the memory includes a DRAM.

12. A generation device comprising:

a first interface configured to receive a directed graph and multiple first vectors, the directed graph including multiple first nodes each assigned with an ID, the multiple first nodes respectively corresponding to the multiple first vectors, the multiple first vectors being included in a search range;

a second interface configured to output data to a storage device connected to the generation device; and a processor configured to execute setting one of the multiple first nodes as a second node; and writing an information piece being an element related to the second node out of elements of index information corresponding to the directed graph, the information piece being written via the second interface to the storage device, the information piece including a second vector being a first vector corresponding to the second node out of the multiple first vectors, and an ID and a third vector for each of one or more third nodes, the third nodes being all out-neighbor nodes of the second node out of the multiple first nodes, the third vector corresponding to one of the third nodes, wherein the processor is configured to execute multiple times of first operations, each of the multiple times of first operations including the setting and the writing, the writing in each of the multiple times of first operations is performed by writing the information piece in a different storage region among multiple storage regions in the storage device, and each of the multiple storage regions corresponds to a unit of access to the storage device.

13. The generation device according to claim 12, wherein the third vector include the first vector corresponding to the third node, or a vector generated by compressing the first vector corresponding to the third node.

14. The generation device according to claim 12, wherein the setting in each of the multiple times of first operations includes setting, as the second node, a first node not yet been set as the second node out of the multiple first nodes, and the processor is further configured to execute the multiple times of first operations until there is no first node not yet been set as the second node.

15. The generation device according to claim 12, wherein the processor is configured to add, to the information piece, information about the number of out-neighbor nodes of the second node.

16. The generation device according to claim 12, wherein the writing includes adding, to the information piece, a fourth vector generated by compressing the second vector.

17. The generation device according to claim 12, wherein the writing includes generating the information piece in which the second vector is arranged at a head.

18. The generation device according to claim 12, wherein the information piece includes no ID of the second vector.

* * * * *